Jan. 21, 1958 E. C. DAVIS 2,820,560
LOAD HANDLING APPARATUS FOR TRUCKS
Filed Sept. 13, 1956 8 Sheets-Sheet 1
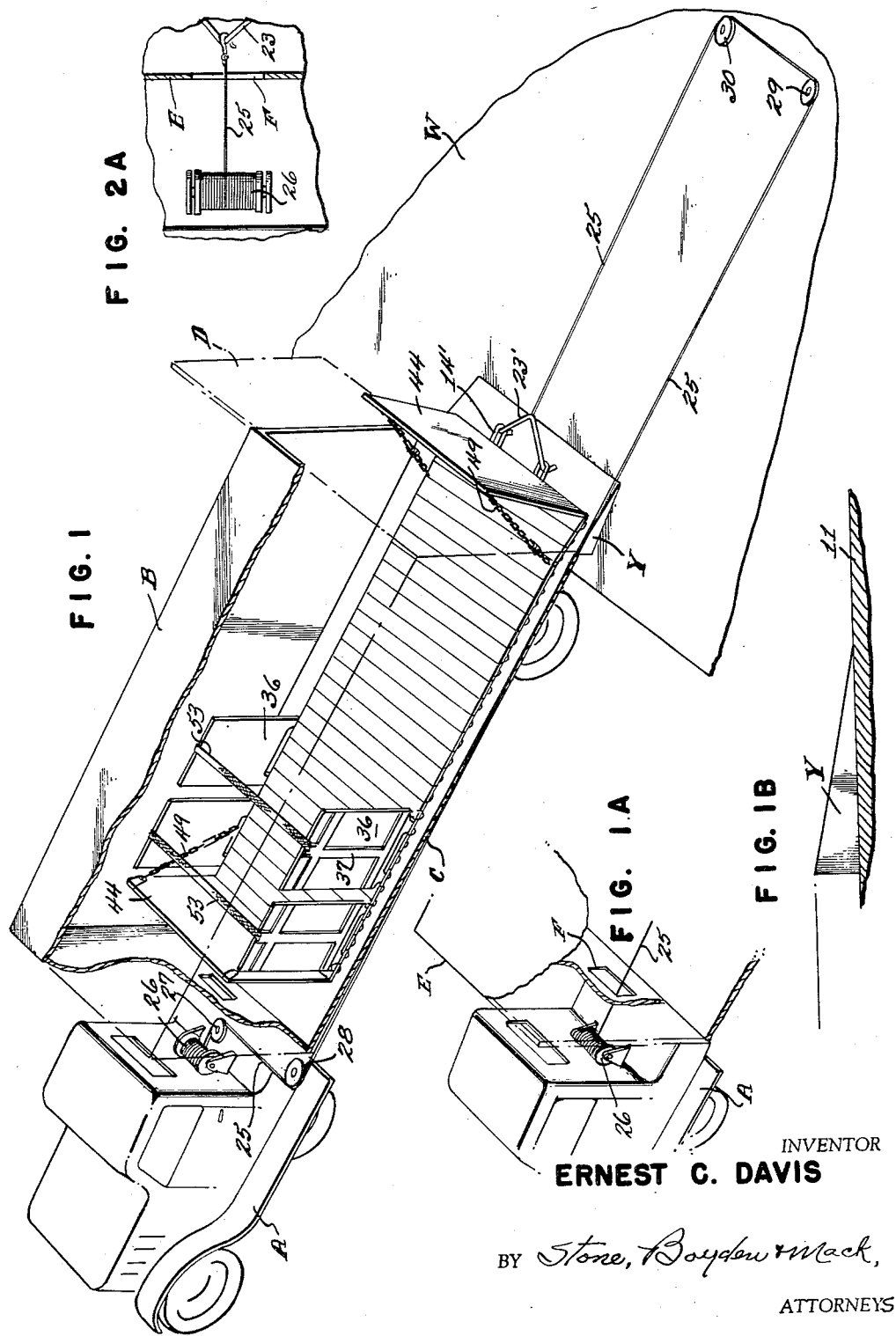
INVENTOR
ERNEST C. DAVIS
BY Stone, Boyden & Mack,
ATTORNEYS Jan. 21, 1958 E. C. DAVIS 2,820,560
LOAD HANDLING APPARATUS FOR TRUCKS
Filed Sept. 13, 1956 8 Sheets-Sheet 2

INVENTOR
ERNEST C. DAVIS
BY Stone, Boyden Mack,
ATTORNEYS.

Jan. 21, 1958 E. C. DAVIS 2,820,560
LOAD HANDLING APPARATUS FOR TRUCKS
Filed Sept. 13, 1956 8 Sheets-Sheet 3
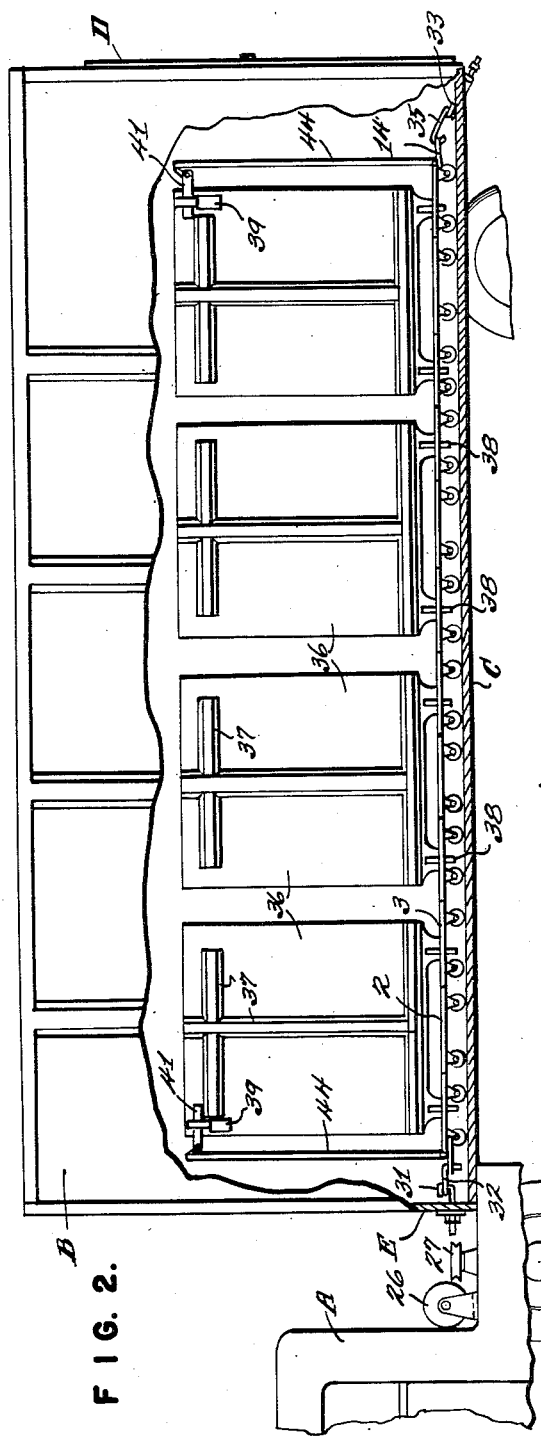
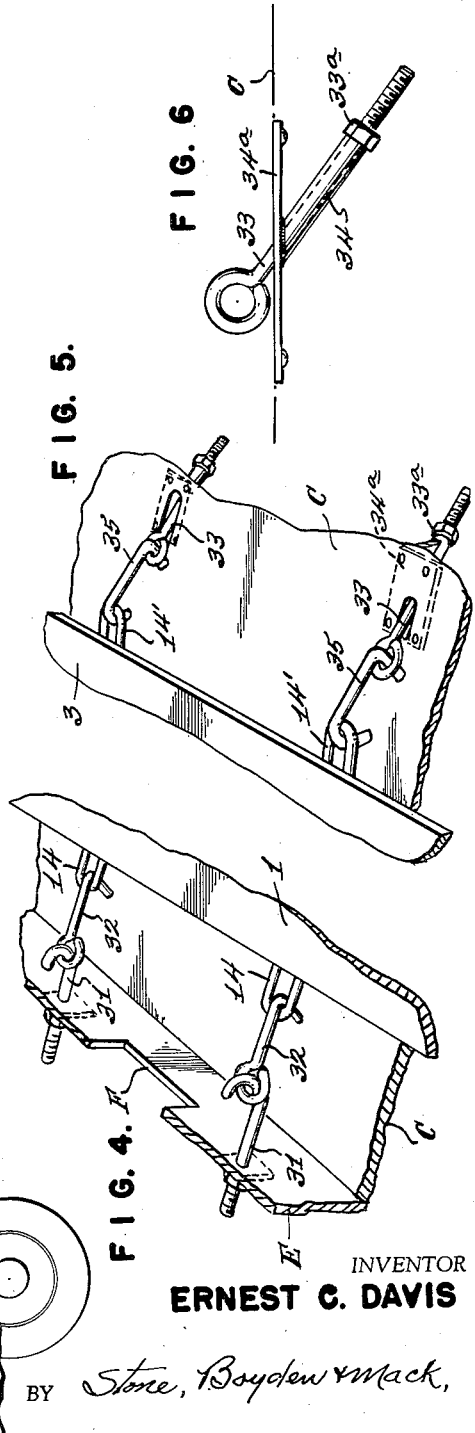
INVENTOR
ERNEST C. DAVIS
BY Stone, Boyden & Mack,
ATTORNEYS Jan. 21, 1958  E. C. DAVIS  2,820,560
LOAD HANDLING APPARATUS FOR TRUCKS
Filed Sept. 13, 1956  8 Sheets-Sheet 4
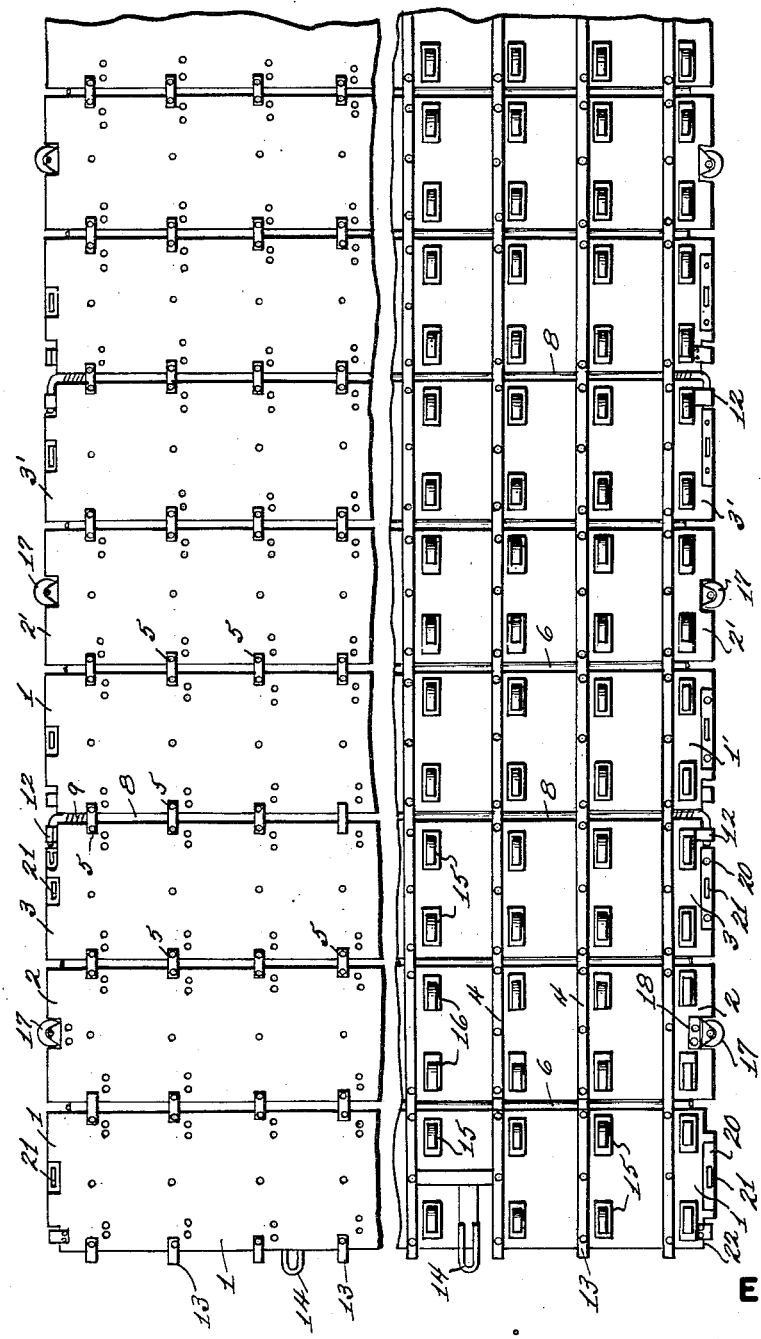
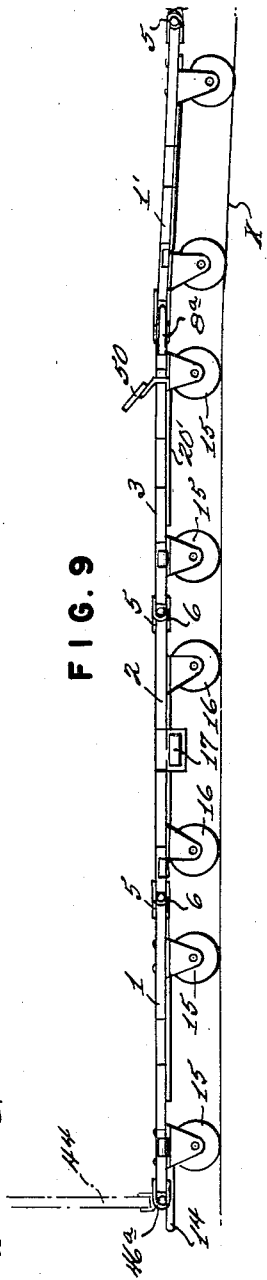
FIG. 7.  FIG. 8.  FIG. 9
INVENTOR
ERNEST C. DAVIS
BY Stone, Boyden & Mack,
ATTORNEYS Jan. 21, 1958 E. C. DAVIS 2,820,560
LOAD HANDLING APPARATUS FOR TRUCKS
Filed Sept. 13, 1956 8 Sheets-Sheet 5
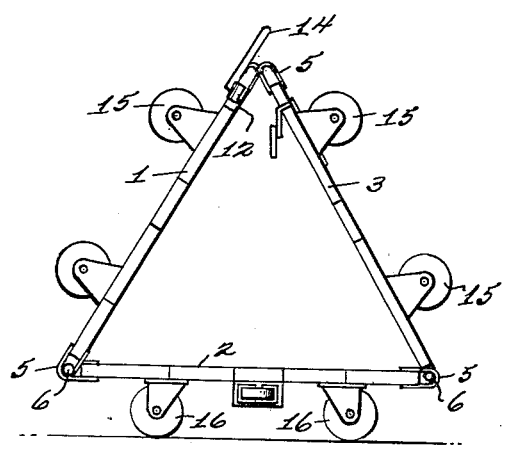
FIG. 27.
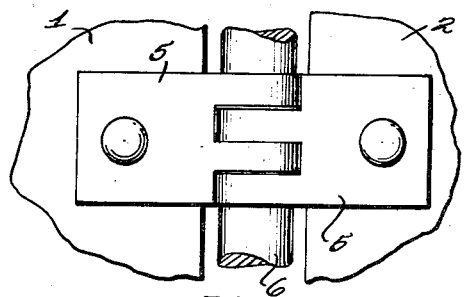
FIG. 11
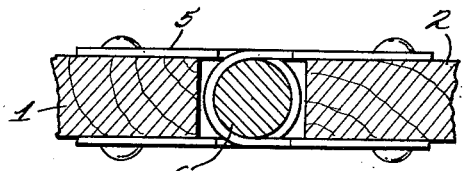
FIG. 12.
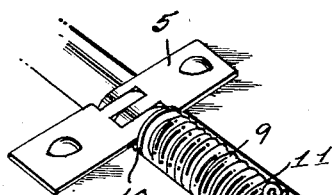
FIG. 10
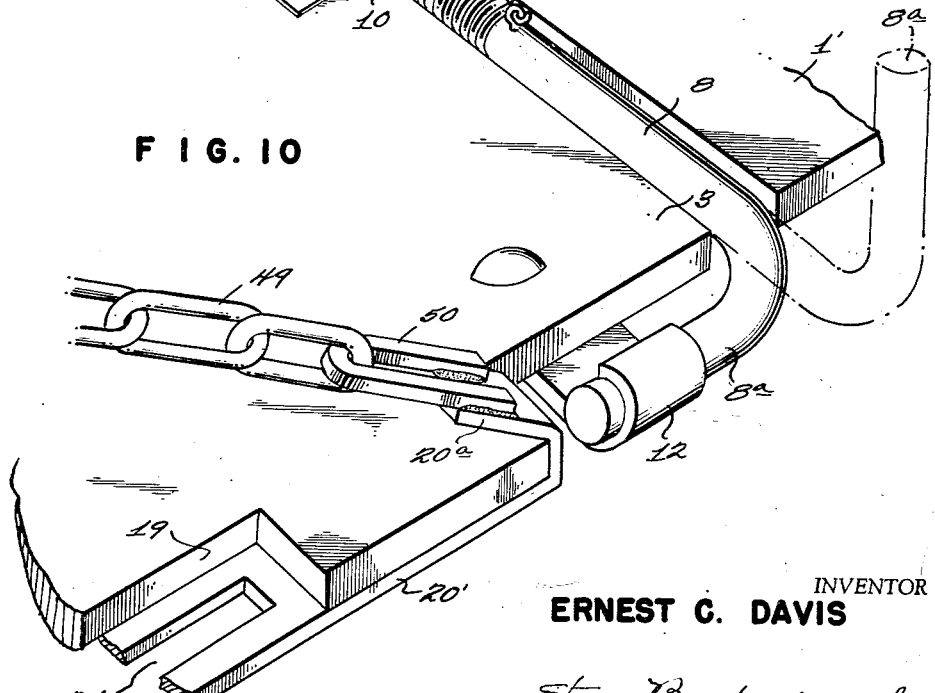
INVENTOR
ERNEST C. DAVIS
BY Stone, Boyden & Mack,
ATTORNEYS Jan. 21, 1958  E. C. DAVIS  2,820,560
LOAD HANDLING APPARATUS FOR TRUCKS
Filed Sept. 13, 1956  8 Sheets-Sheet 6
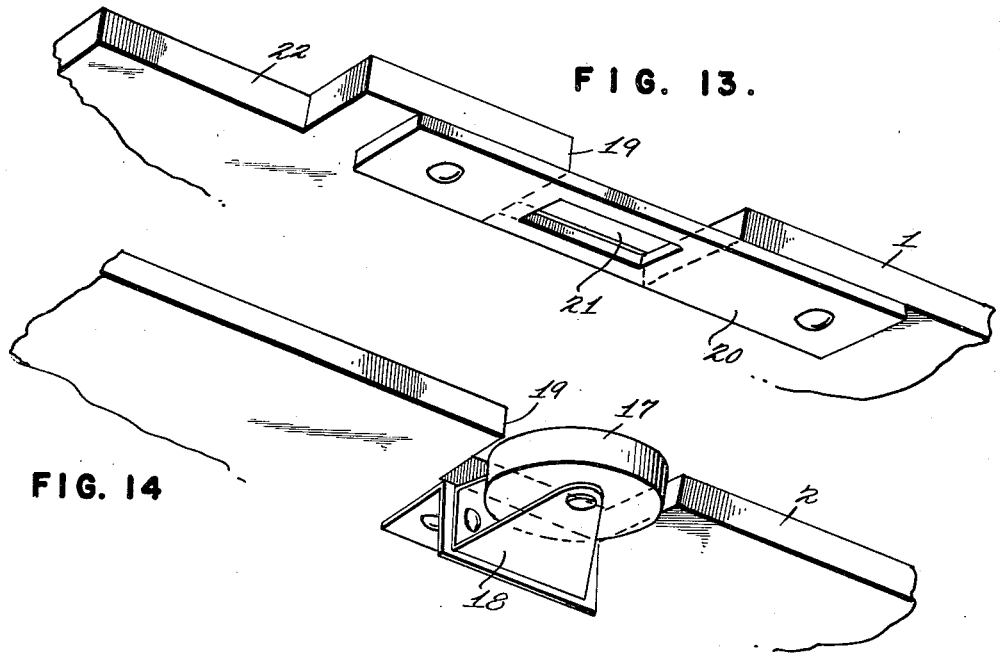
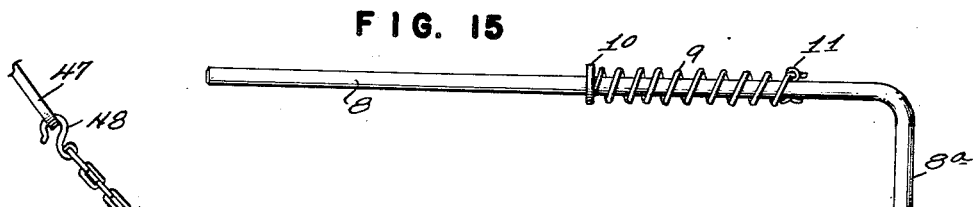
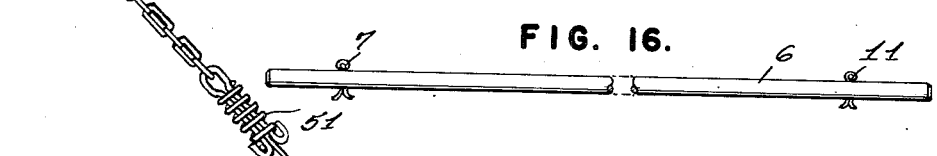
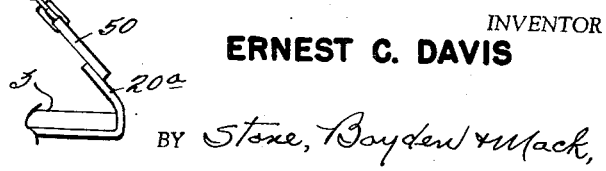
INVENTOR
ERNEST C. DAVIS
BY Stone, Boyden & Mack,
ATTORNEYS Jan. 21, 1958 E. C. DAVIS 2,820,560
LOAD HANDLING APPARATUS FOR TRUCKS
Filed Sept. 13, 1956 8 Sheets-Sheet 7

INVENTOR
ERNEST C. DAVIS

BY *Stone, Boyden & Mack*

ATTORNEYS

Jan. 21, 1958  E. C. DAVIS  2,820,560
LOAD HANDLING APPARATUS FOR TRUCKS
Filed Sept. 13, 1956  8 Sheets-Sheet 8
FIG. 22
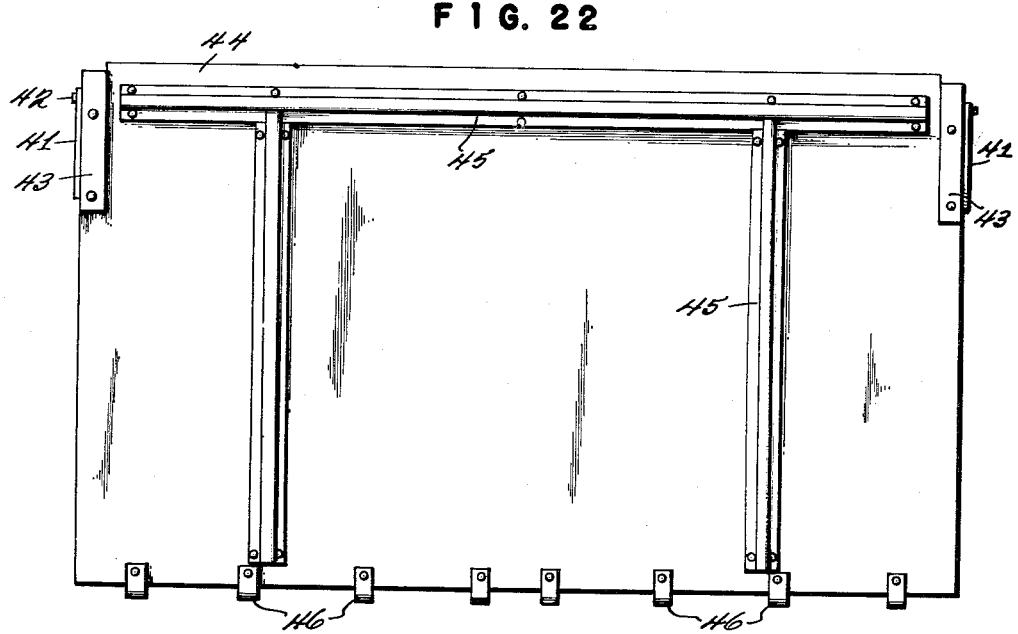
FIG. 25
FIG. 23.
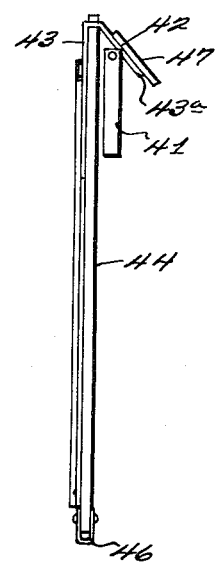
FIG. 24.
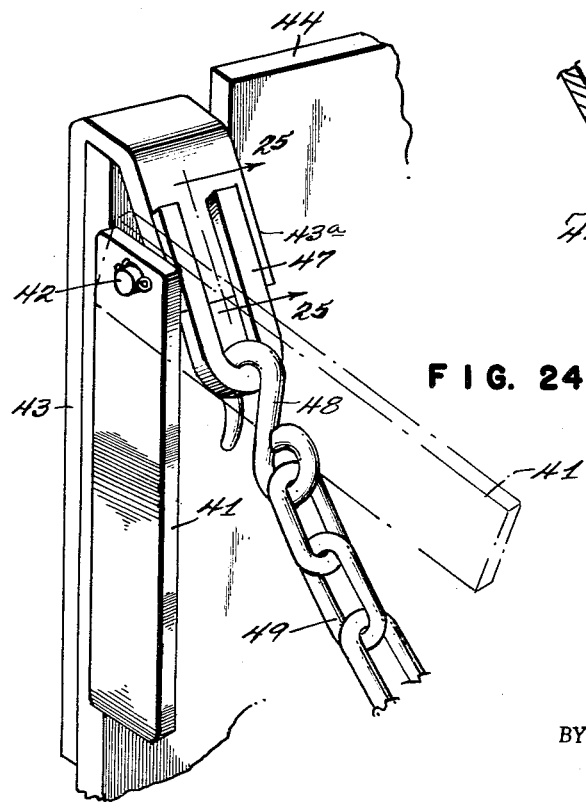
INVENTOR
ERNEST C. DAVIS
BY *Stone, Boyden & Mack,*
ATTORNEYS

United States Patent Office 2,820,560
Patented Jan. 21, 1958

2,820,560

LOAD HANDLING APPARATUS FOR TRUCKS

Ernest C. Davis, Elmhurst, Ill., assignor to Illinois Farm Supply Company, Chicago, Ill., a corporation of Illinois Application September 13, 1956, Serial No. 609,648

8 Claims. (Cl. 214—517)

This invention relates to load handling devices for trucks, more particularly where the load is made up of a plurality of separate units such as blocks, boxes, bags or other packages.

Where, as usual, such articles are handled in trailer type trucks, the common practice heretofore has been to move such a trailer to a warehouse platform or other shipping or delivery point, and then leave it standing there to be loaded or unloaded by hand. This necessitates the provision of a large number of trailers to take care of a given volume of materials, thus requiring a very substantial sum of money to be invested in vehicles. This naturally increases the cost of handling freight by truck.

The general object of the invention is to reduce such cost by providing means whereby a truck trailer may be loaded or unloaded in a relatively short time, while the driver waits, thus avoiding the necessity of tying up the trailer at the warehouse or shipping point over extended periods.

To this end, the invention contemplates the provision of a load carrier which may be moved bodily onto and off of a truck, or trailer, by power-driven mechanism.

More specifically, the invention provides a load carrier made up of a series of hingedly connected pallets, each mounted on rollers, and a power-operated winch by which the carrier may be pulled onto or off of a truck or trailer.

A further object is to devise improved means by which readily detachable side and end panels may be secured to the carrier, when desired, to hold the load in position.

In order that the invention may be readily understood, reference is had to the accompanying drawings, forming part of this specification, and showing by way of example, one embodiment of the invention, in which drawings:

Fig. 1 is a perspective view of the complete load carrier in position in a truck of the semi-trailer type, parts being broken away, the means for unloading the carrier onto a receiving platform being also shown;

Fig. 1A is a fragmentary perspective view showing how the load carrier is pulled onto a truck trailer;

Fig. 1B is a fragmentary side elevation showing a ramp which may be used between the trailer and platform when they are not of the same height;

Fig. 2 is a side elevation, on a larger scale than Fig. 1, showing the complete load carrier in position, and illustrating the means for anchoring the carrier to the truck trailer, parts being broken away;

Fig. 2A is a fragmentary plan view on a small scale, showing the means for pulling the load carrier into position on the truck trailer;

Fig. 4 is a fragmentary perspective view on an enlarged scale showing the means for anchoring the front end of the load carrier to the truck trailer;

Fig. 5 is a similar view showing the means for anchoring the rear end of the load carrier;

Fig. 6 is a still further enlarged detail of one of the elements shown in Fig. 5;

Fig. 7 is a partial plan view of some of the connected pallets constituting the load carrier;

Fig. 8 is a similar view, but looking at the bottom side of the pallets;

Fig. 9 is a side elevation on a somewhat enlarged scale showing a group of the connected pallets;

Fig. 10 is a fragmentary perspective on a greatly enlarged scale, showing portions of two adjacent pallets and the removable hinge pin connecting them;

Fig. 11 is a fragmentary plan view on a greatly enlarged scale showing one of the hinges used to connect the pallets of a group;

Fig. 12 is a transverse vertical section therethrough;

Fig. 13 is a fragmentary perspective view on a scale similar to Fig. 10 showing a portion of one end of the end pallet of the series;

Fig. 14 is a similar view showing a portion of one end of the next adjacent pallet;

Fig. 15 is a side elevation of one of the removable hinge pins connecting groups of pallets;

Fig. 16 is a similar view of one of the hinge pins permanently connecting the pallets of a group;

Fig. 22 is a side elevation of one of the end panels;

Fig. 23 is an edge view thereof;

Fig. 24 is a fragmentary perspective view on an enlarged scale showing one upper corner of such end panel;

Fig. 25 is a section on the line 25—25 of Fig. 24, looking in the direction of the arrows;

Fig. 26 is a view of the chain used for bracing the end panels; and

Fig. 27 is an end elevation showing the pallets of a group folded into triangular configuration.

Figure 3:
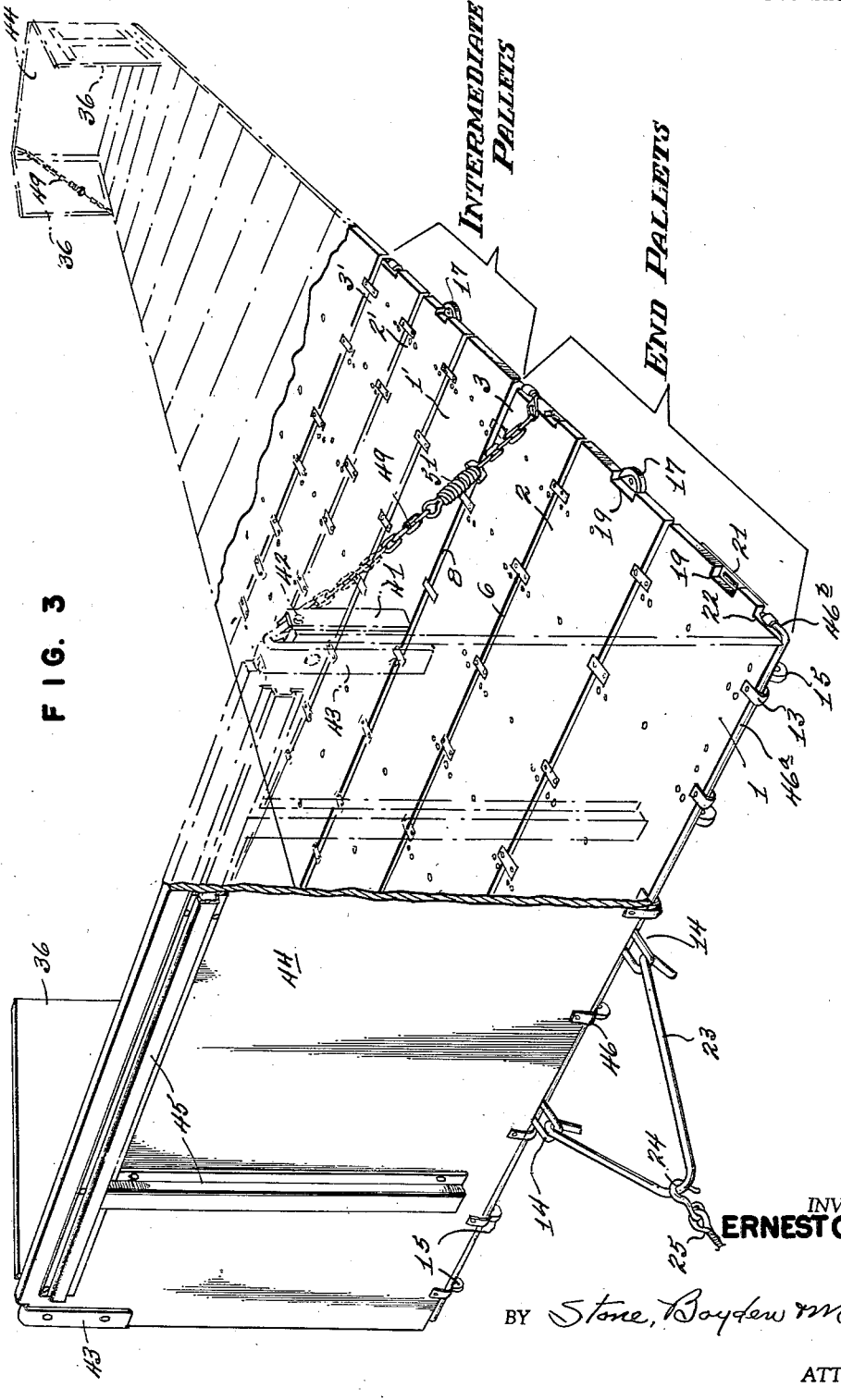
Fig. 3 is a perspective view of the load carrier, looking from the front end, parts being broken away, and parts being shown in broken lines.
Figure 17:
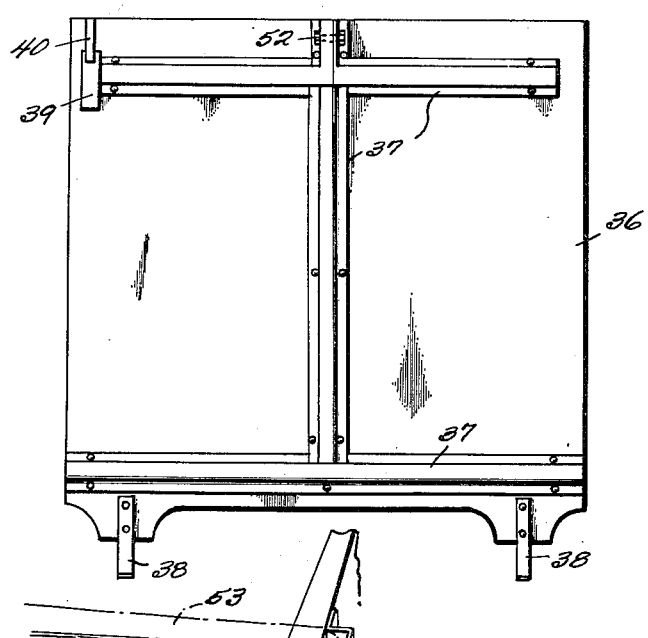
Fig. 17 is a side elevation on a larger scale of one of the side panels.
Figure 18:
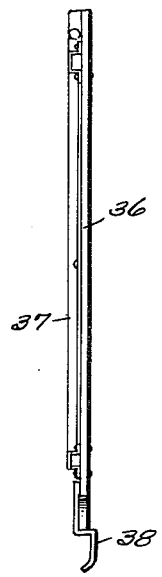
Fig. 18 is an edge elevation thereof.

Referring to the drawings in detail and more particularly first to Figs. 1–3 thereof, I have illustrated a conventional trailer-type truck comprising a tractor unit A and a semi-trailer B. This trailer has a floor C, a rear door D and a front wall E through which is formed an opening F, as hereinafter described.

My improved load carrier comprises a series of relatively long and narrow rectangular pallets, 1, 2, 3, 1', 2', 3', etc., these pallets being pivotally connected at their adjacent side edges by means of hinges 5. These pallets may be made of either wood or metal and may be reinforced on their underside by means of straps 4, preferably extending in line with the hinges, as shown in Fig. 8.

The pallets are divided into groups of three, as clearly shown in Fig. 3, the three pallets of each group being permanently connected by means of hinge pins 6 extending through the hinges 5 as clearly shown in Figs. 11 and 12 and held in place by cotter pins 7, as shown in Fig. 16.

The adjacent pallets of each group, as, for example, the pallets 3 and 1' are connected by means of a removable hinge pin 8, shown in detail in Figs. 10 and 15. This hinge pin is surrounded by a coil spring 9 bearing at one end against a washer 10 and having its other end secured as at 11 to the pin 8. The end of the pin is bent at right angles as shown at 8a and this bent end is adapted to be held in a keeper 12, best shown in Fig. 10. It will be seen that the tension of the spring 9 holds the bent end 8a in engagement with the keeper 12. When it is desired to remove the pin 8 it is moved longitudinally to a slight extent to further compress the spring 9 and permit the bent end 8a to be disengaged from the keeper. The bent end can then be swung into some such position as indicated in broken lines in Fig. 10, and the pin then freely withdrawn from the hinges.

The purpose of using the removable hinge pin between groups of pallets is so that these groups may be separated if desired, and the pallets of the group folded into triangular configuration as shown in Fig. 27. When thus folded the pallets of a group may easily be handled by one man.

Referring to Figs. 7 and 8, it will be seen that the end pallet 1 is provided at its free edge with a series of loops 13, for a purpose hereinafter described, and with a pair of U-shaped traction lugs 14.

On the bottom of each pallet is mounted a plurality of rollers 15 supported on brackets rigidly attached to the pallet, eight of such rollers being illustrated in the drawings. The pair of rollers at one end of the middle pallet such as 2 of each group are mounted in swiveled brackets as indicated at 16 in Figs. 8 and 27. The reason for using swiveled brackets on casters at the end of the middle pallet of a group is to enable a workman to pick up one end of the folded group shown in Fig. 27 and roll it along on the swiveled casters 16 at the other end, after the manner of a hand truck.

It will be understood that as shown in Figs. 1 and 3, the pallets extend transversely of the truck trailer and are of a length substantially equal to the width of such trailer. In addition to the rollers or casters 15 and 16, certain selected pallets have mounted in brackets 18 on their ends in a horizontal plane guide rollers 17 adapted to engage the side walls of the trailer as the load carrier is moved onto or off of the same as hereinafter described. One of these guide rollers is illustrated in detail in Fig. 14, and is shown in this figure and in Fig. 8 as being mounted on the pallet 2, a notch 19 being preferably formed in the edge of the pallet adjacent the roller.

From an inspection of Figs. 7 and 8 it will be seen that the guide rollers 17 are mounted on every third pallet of the series, and preferably on the middle pallet of each group. On the ends of the other pallets of the group, on each side of the middle pallet, is mounted a plate 20 which bridges the notch 19 and is provided with a central opening 21 lying within this notch, for a purpose hereinafter described.

By reference to Fig. 13 it will be seen that the end of the end pallet 1 is formed with an additional notch 22, also shown in Figs. 7 and 8 and hereinafter further described.

As best shown in Fig. 3, a V-shaped tow bar 23 has its ends engaged in the traction lugs 14 secured to the pallet 1 and is adapted to be engaged by a hook 24 secured to the end of a cable 25 wound on a winch 26. When it is desired to pull the load carrier from a loading platform such as shown at W in Fig. 1 onto the trailer truck, the cable 25 is passed through the opening F in the end wall of the trailer, as shown in Figs. 1A and 2A and is attached to the tow bar 23. It will be understood that the winch 26 is driven in any suitable way (not shown) from the truck tractor motor, and when the winch is thus operated the cable 25 will be wound up and the load carrier pulled from the platform W onto the floor of the trailer. Having once been pulled to the proper position, the load carrier is anchored to the trailer by any suitable means such as shown in Figs. 4, 5 and 6. As illustrated in these figures, a pair of hooks 31 are adjustably mounted in the front wall E of the trailer and hooked links 32 connect the hooks 31 with the traction lugs 14 secured to the pallet 1 at the front end of the series.

At the rear end similar traction lugs 14' are secured to the end panel and hooked links 35 connect these lugs with eye bolts 33 set at an angle in the floor C of the trailer. These eye bolts extend through a plate 34a secured to the trailer bottom and through a sleeve 34 welded to the underside of this plate. Nuts 33a, working on the eye bolts 33 engage the ends of these sleeves 34.

It will thus be seen that by tightening up these nuts 33a, and the nuts working on the hooks 31, the entire carrier may be firmly anchored to the trailer and held against accidental movement.

When it is desired to unload or remove the load carrier from the truck trailer, a tow bar 23' is engaged with the traction lugs 14' at the rear of the carrier. The cable 25 from the winch 26 is passed over pulleys 27 and 28 on the truck and thence rearwardly over and around pulleys 29 and 30 secured to the loading platform, the free end of the cable being secured to the tow bar 23' as shown in Fig. 1. From this it will be clear that when the winch 26 is operated the cable 25 will be drawn in and the load carrier will be pulled off of the truck trailer and onto the platform, the anchoring devices shown in Fig. 4 having, of course, been removed.

At this point it may be pointed out that the fact that the load carrier consists of a series of relatively narrow hingedly connected pallets makes the carrier flexible vertically and capable of rolling over more or less irregular surfaces. This is illustrated in Fig. 9 where a portion of the surface is indicated at X as being inclined with respect to the rest of the surface. To use a common expression, the pivotally connected series of pallets, when pulled over an irregular surface, has a caterpillar action.

In like manner, if the loading platform happens to be at a slightly lower level than the floor of the truck, I can employ a ramp Y, as shown in Figs. 1 and 1B, and the flexibility of the carrier permits it to easily roll up and down this ramp.

When handling certain classes of freight, such as large bags of feed, fertilizer, cement, etc., these bags can be simply piled on the pallets of the load carrier and do not require any supports at the sides. However, with other types of freight it may be desirable to provide such supports. I have therefore shown in Figs. 1 and 2 a plurality of side panels 36, one of such panels being illustrated in detail in Figs. 17–20.

Figure 19:
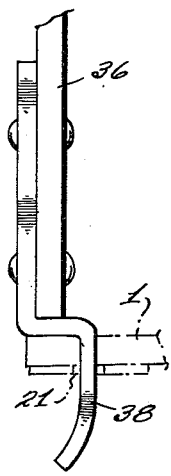
Fig. 19 is an enlarged detail of the lower end thereof, a portion of a pallet being shown in broken lines.

Each panel is preferably reinforced with suitable bars 37, shown as of channel section. At its lower edge each panel is provided with a pair of hook-shaped tenons 38, these tenons being adapted to pass through the openings 21 in the plates 20 secured to the ends of the pallets as illustrated in Fig. 19. It will be understood that these tenons are so spaced that when applied to the sides of the load carrier they enter openings 21 in alternate pallets, so that, as shown, there would be one panel for each group of three pallets.

At its upper edge adjacent one end of the end panel 36 is secured a plate 39 on the outer surface of which is welded a second plate 40, thus forming a space between the plate 40 and the panel to receive a locking bar 41. This bar is pivoted at 42 to a bracket 43 secured to a panel 44 which is adapted to be mounted at the end of the load carrier (see Figs. 20–25).

One of the panels 44 is shown in detail in Fig. 22 and, like panel 36, it is preferably reinforced with channel-shaped bars 45. At its lower edge this panel carries a series of loops 46, which, when the panel is placed in position as shown in Figs. 3 and 9, line up with the loops 13 carried by the end pallet 1, and a bar or pin 46a is then passed through the aligned loops. The end of this pin may be bent at right angles and held in a keeper, in a manner similar to that illustrated in Fig. 10 in connection with the hinge pin 8.

It will be understood that an end panel 44 is used at each end of the load carrier, and that by virtue of the locking bars 41 these end panels are locked to the adjacent side panels 36.

Secured to the downturned end 43a of the bracket 43, as by welding, is a U-shaped member 47, and in this member is engaged a hook 48 (see Fig. 24) secured to a chain 49. This chain is secured at its other end to a similar U-shaped member 50 welded to the turned-up end 20a of a plate 20' secured to the pallet 3 as shown in Figs. 9 and 26. Interposed in the length of this chain 49 is a resilient coupling member 51, constructed to permit slight stretching of the chain. One of these chains 40 is employed at each side of the end panels 44 as shown in Figs. 1 and 3.

Figure 20:
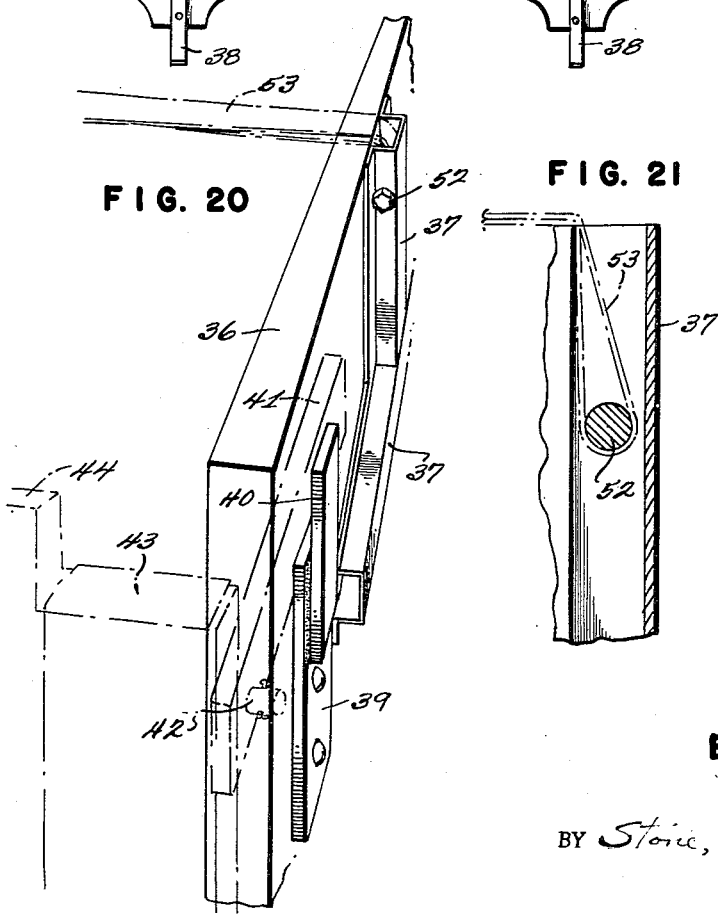
Fig. 20 is a fragmentary perspective view of one of the side panels, a portion of an adjacent end panel being shown in broken lines.
Figure 21:
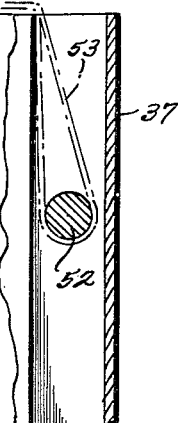
Fig. 21 is a fragmentary vertical section on an enlarged scale through the upper part of one of the reinforcing bars carried by the side panels.

In order to tie opposite side panels together to enable them to support the load, I have devised the arrangement shown in Figs. 20 and 21. By reference to these figures it will be seen that a bolt 52 extends transversely through the upper end of the vertical channel member 37, and a flexible strap 53 of suitable material such as heavy webbing is looped around this bolt and extends across the load carrier from one side panel to the other, as shown in Fig. 1. Thus, the side panels of each pair are firmly tied together.

Where, in the specification and claims I use the word "trailer" I, of course, mean to include any kind of truck, either of the rigid frame or semi-trailer type, as well as ordinary trailers.

What I claim is:

1. Load handling apparatus for trucks comprising a series of separate load receiving pallets, each independently supported on rollers, said pallets being hingedly connected along adjacent edges, and means for pulling said series of hingedly connected pallets completely onto and off of the floor of a truck, longitudinally thereof, the hinge connection between pallets being so constructed that the series of pallets may flex vertically, whereby said series can conform with and travel over irregular surfaces.

2. Load handling apparatus for trucks comprising a series of separate load receiving pallets, each independently supported on rollers, said pallets being hingedly connected along adjacent edges by horizontally disposed pivot pins extending transversely of said series, means for pulling said series of hingedly connected pallets completely onto a truck from the rear end thereof, and means at each end of the series for anchoring said series of pallets to the ends of the truck after they have been placed in proper position.

3. Load handling apparatus for trucks, comprising a series of separate pallets, each independently supported on rollers, said pallets being relatively long and narrow and hingedly connected along their adjacent longitudinal edges, each of said pallets extending transversely of the truck body, and power means for pulling said series of hingedly connected pallets completely onto and off of a truck from the rear end thereof.

4. Load handling apparatus for trucks, comprising a series of separate pallets, each independently supported on rollers, said pallets being relatively long and narrow and hingedly connected along their adjacent longitudinal edges, the hinge connection between every third pallet and the adjacent pallet comprising a readily removable hinge pin, while the remaining hinge pins are fixed in place, whereby said series of pallets may be broken up into groups of three for easy handling, and the pallets of each group folded on each other into a configuration of triangular section.

5. Load handling apparatus for trucks comprising a series of separate pallets, each independently supported on rollers, said pallets being hingedly connected along adjacent edges, and an upright panel supported on and detachably secured to one of the end pallets of the series at its free edge.

6. Load handling apparatus for trucks comprising a series of separate pallets, each independently supported on rollers, said pallets being hingedly connected along adjacent edges, an upright end panel supported on and secured to one of the end pallets of the series at its free edge, and means for detachably securing additional upright panels to the outside edges of the pallets at each side of the series.

7. Load handling apparatus for trucks comprising a series of separate pallets, each independently supported on rollers, said pallets being hingedly connected along adjacent edges, an upright end panel supported on and secured to one of the end pallets of the series at its free edge, means for detachably securing additional upright panels to the pallets at each side of the series, and means for locking said end panel to the adjacent side panels at the end of the series.

8. Load handling apparatus for trucks comprising a series of separate pallets, each independently supported on rollers, said pallets being hingedly connected along adjacent edges, pairs of upright panels detachably secured to the pallets at each side of the series, and means for tying together the panels of each pair at their upper edges.

References Cited in the file of this patent

UNITED STATES PATENTS

| | | |
|---|---|---|
| 1,268,555 | Epstein | June 4, 1918 |
| 1,581,746 | Kellett | Apr. 20, 1926 |
| 1,591,655 | Callison | July 6, 1926 |
| 2,514,752 | Faulkner et al. | July 11, 1950 |
| 2,678,139 | Gildersleeve | May 11, 1954 |
| 2,761,581 | Cohee | Sept. 4, 1956 |
| 2,775,355 | Leitner et al. | Dec. 25, 1956 |